Oct. 30, 1962 K. N. FROMM 3,061,831
RADIO DIRECTION FINDING SYSTEM
Filed June 17, 1958 3 Sheets-Sheet 1
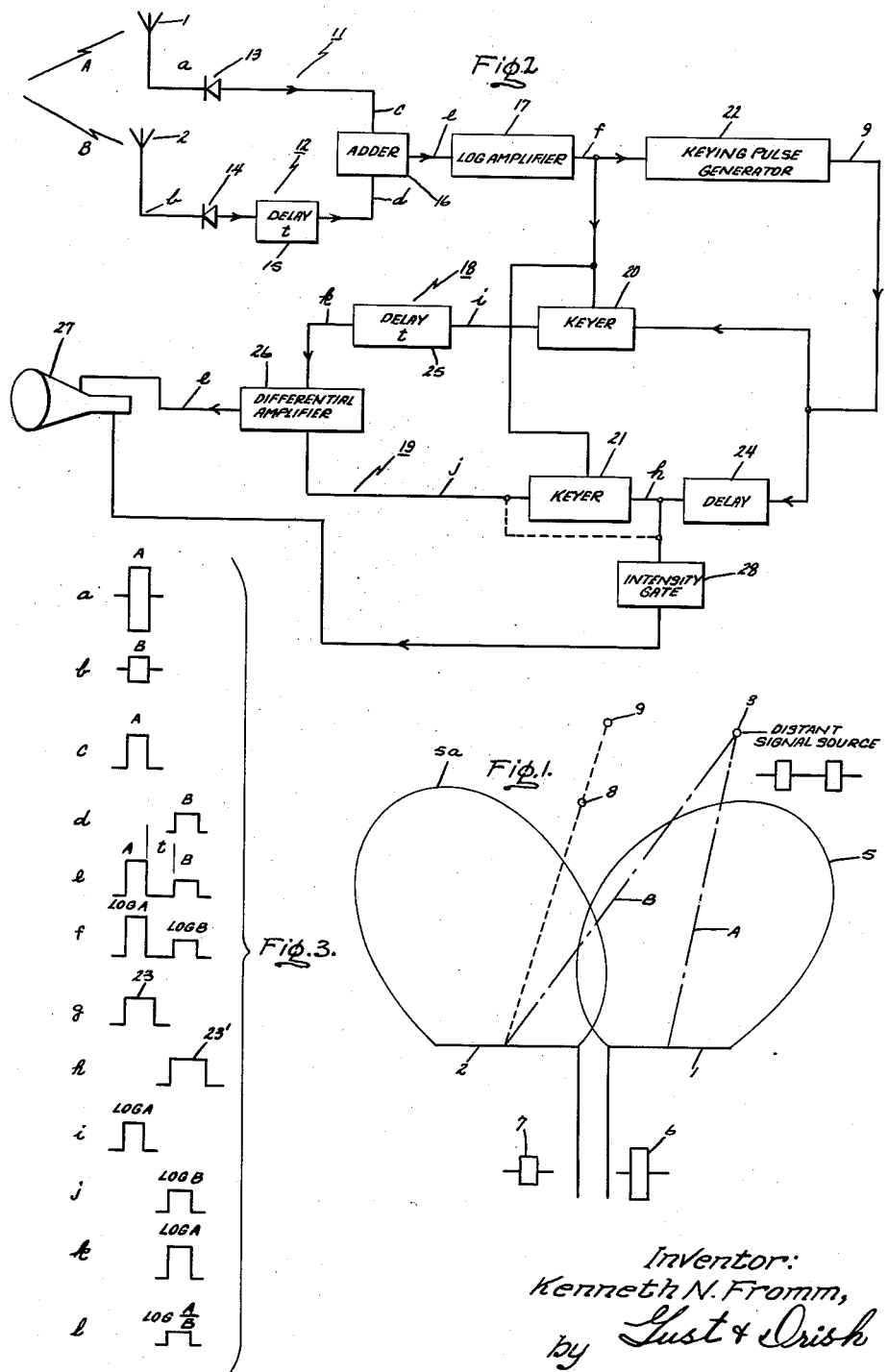
Inventor:
Kenneth N. Fromm,
by Lust & Orish
Attorneys.

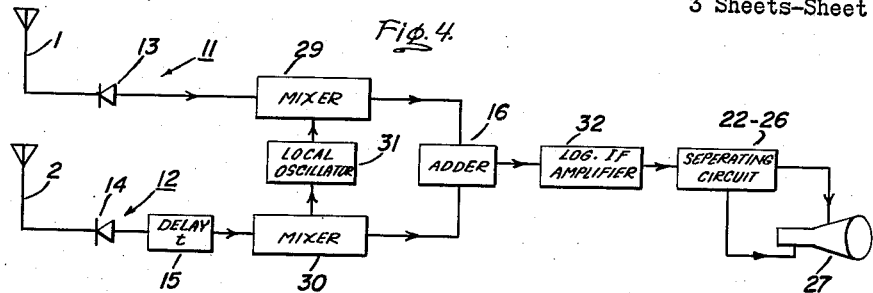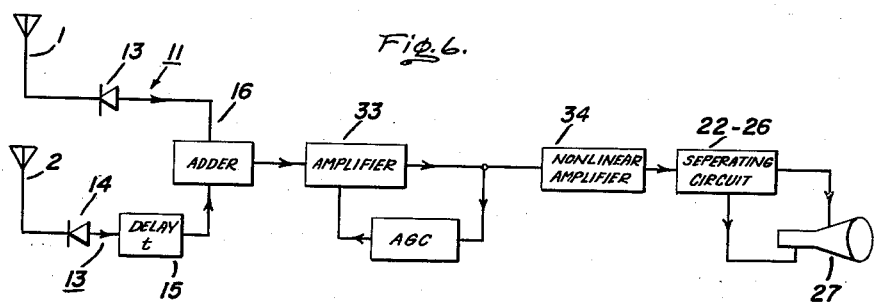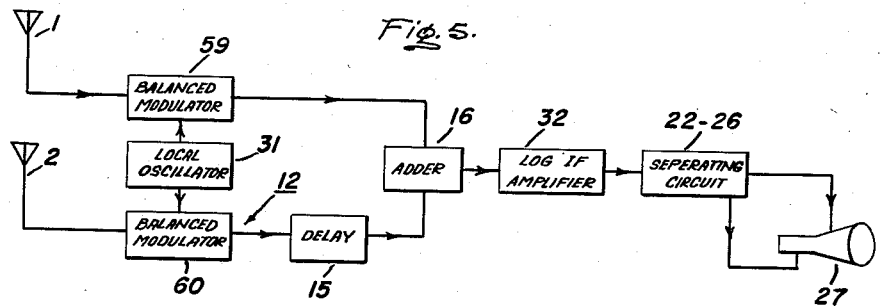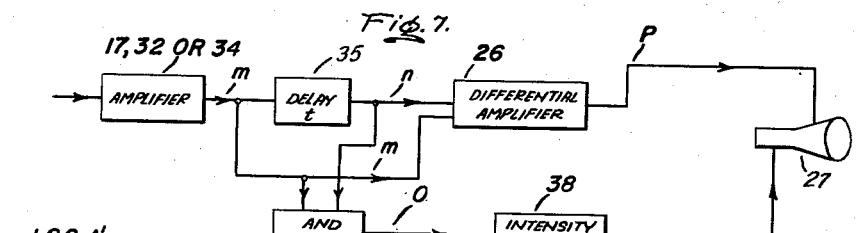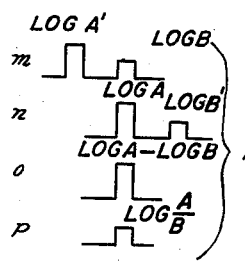

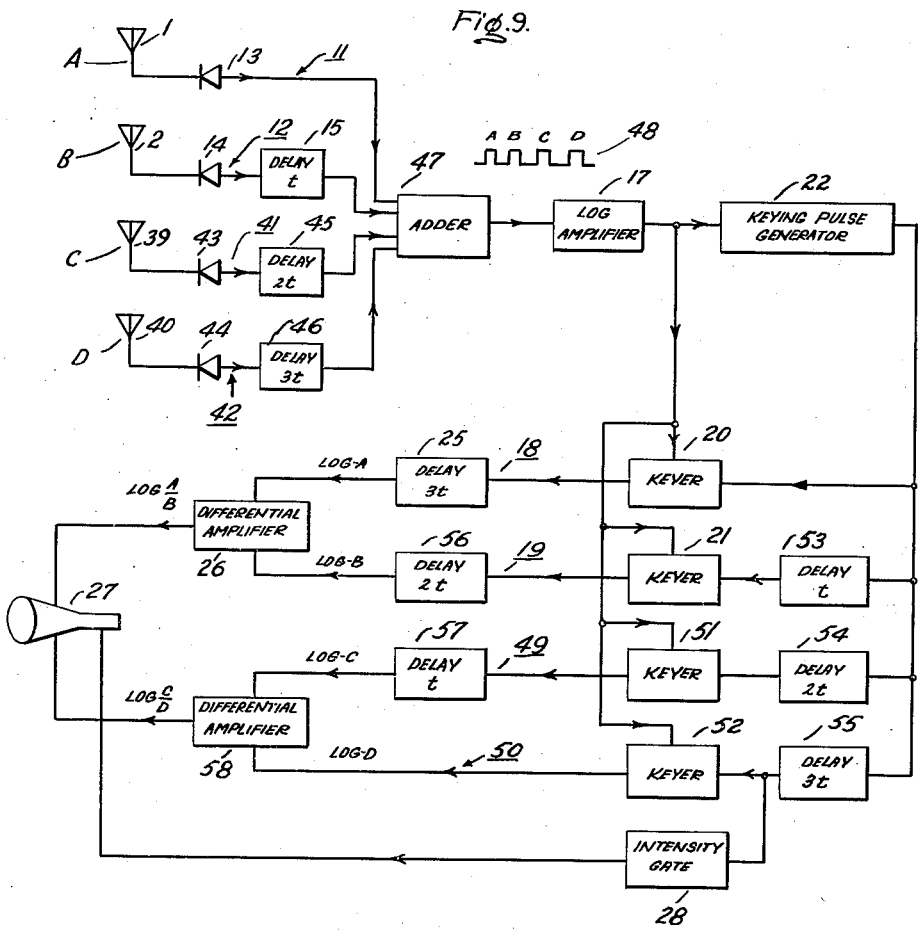

United States Patent Office 3,061,831
Patented Oct. 30, 1962

1

3,061,831
RADIO DIRECTION FINDING SYSTEM
Kenneth Norman Fromm, Cincinnati, Ohio, assignor to International Telephone and Telegraph Corporation
Filed June 17, 1958, Ser. No. 744,033
3 Claims. (Cl. 343—121)

This invention relates to radio direction finding systems, and more particularly to a radio direction finding system in which the distant source of radio signals provides relatively short spaced apart pulses.

In certain radio direction finding systems employed in the location of a distant source of relatively short spaced apart pulses, two antennas with different directivity are used. It is desirable to obtain on a cathode ray tube a deflection which is proportional to the angle off the axis in which the signal arrives, i.e., to the ratio of the amplitudes to which the two antennas are excited by the incoming signal.

Furthermore, it is desirable that this be ascertained independently of the distance of the pulse source and thus the pulse strength; it will be seen that a weak received signal from a distance source at a small angle may provide the same antenna output signal as a strong received signal from a closer source at a greater angle. A signal giving directional information independent of power input has in prior systems been obtained by performing electronically the mathematical operation $$\frac{(A-B)}{(A+B)}$$

where A is the signal output of one of the antennas and B is the signal output of the other antenna. An alternative solution to the problem of providing the required directional information independent of the power input has been with the use of logarithmic amplifiers providing a function $$\log A - \log B \left( = \log \frac{A}{B} \right)$$

It is seen that with each of the prior arrangements, a ratio of the amplitudes of the signals respectively received by the two antennas is provided, this ratio being only proportional to the angle between the two received signals and being independent of the actual signal strength.

In the above described prior systems for obtaining a ratio of the two received signals, two amplifiers were employed for the A and B channels. The disadvantage of such systems, however, was the requirement that the two amplifiers track to within a fraction of a db over the dynamic range of the amplifiers in order to obtain accurate direction information, i.e. the amplifiers were required to have substantially identical response characteristics. This requirement is, however, difficult to obtain in practice and it is therefore desirable to provide a radio direction finding system of the type here under discussion in which a single amplifier may be employed for both input signals.

In accordance with the broader aspects of my invention therefore, I provide a radio direction finding system having two input circuits for respectively receiving a radio signal from a distant source for providing two input signals in response thereto. Time delay means is provided in one of the input circuits for delaying the input signal therein with respect to the input signal in the other input circuit. The two input circuits are coupled to means for adding the undelayed and delayed signals so that they now occur in sequence and amplifying means, which in the preferred embodiment of my invention is a logarithmic amplifier, is coupled to the adding means. Means are then provided for separating the undelayed

2 and delayed signals and for delaying the previously undelayed signal so that it is made to coincide with the previously delayed signal. The two signals, which are now in coincidence, are then fed to means for differentially combining the signals, thereby providing an output signal representing the difference of the coincident signals.

It is therefore an object of my invention to provide an improved radio direction finding system.

Another object of my invention is to provide an improved radio direction finding system for providing information of the direction of a distant source of spaced pulses.

A further object of my invention is to provide an improved radio direction finding system in which the input signals are sequentially passed through a common amplifier.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 diagrammatically illustrates two antennas, as employed in a radio direction finding system, with their respective response characteristic loops and signals being received by the two antennas from a remote signal source;

FIG. 2 is a schematic illustration of one embodiment of my invention;

FIG. 3 is an illustration showing the pulses at various points in the system of FIG. 2;

FIG. 4 is a schematic illustration showing another embodiment of my invention in which the input signals are converted to an IF signal for subsequent amplification and separating;

FIG. 5 is a schematic illustration of a modified form of the embodiment of FIG. 4;

FIG. 6 is a schematic illustration of yet another embodiment of my invention employing an automatic gain control amplifier;

FIG. 7 is a fragmentary schematic illustration showing an alternative form of signal separating circuit which may be employed in any of the embodiments of my invention;

FIG. 8 illustrates the pulses at several points in the system of FIG. 7; and

FIG. 9 is a schematic illustration showing the employment of my invention to provide two-dimensional directional information.

Referring now to FIG. 1, there is shown two antennas 1 and 2 respectively for receiving signals from a distant source 3 of relatively short spaced apart radio frequency pulses 4. It will be understood that the antennas 1 and 2 are schematically shown and may in practice respectively be a pair of arrays, horns, etc. The two antennas 1 and 2 respectively have response loops 5 and 5a as shown and the signal pulses respectively received by the antennas 1 and 2 are designated here as A and B, as shown. It will now be seen that the signal pulses A received by the antenna 1 from the distant source 3 will provide an output pulse 6 having a substantially greater amplitude than the output pulse 7 provided by antenna 2 responsive to the received signal pulses B. It would be thought that mere ascertainment of the respective amplitudes of the input pulses 6 and 7 would provide the requisite information for determining the angular direction of the distant signal source 3, however, inspection of FIG. 1 will readily indicate that a weak signal source 8 relatively close to the antenna 2 will provide an output signal from the antenna 2 having the same amplitude as a relatively strong signal source 9 at a greater distance from the antenna 2. Thus, mere measurement of the respective amplitudes of the input pulses 6 and 7 provided by the antennas 1 and 2 will not provide the desired directional information since these amplitudes are affected by the strength of the signal source and its distance from the antennas. It will, however, be seen that the ratio between the received signals A and B will remain constant regardless of the strength of the signal source.

Referring now to FIGS. 2 and 3, one embodiment of my improved radio direction finding system, generally identified as 10, includes the antennas 1 and 2 for respectively receiving signals A and B, antennas 1 and 2 being respectively connected to input circuits 11 and 12. In this embodiment, detectors 13 and 14, of any conventional form, are connected in the input circuits 11 and 12 and a delay circuit 15, again of any conventional form as is well known in the art, providing a delay time "$t$" is also connected in the input circuit 12. Input circuits 11 and 12 are respectively connected to the input circuits of an adding circuit 16 which has its output circuit connected to the input circuit of a logarithmic amplifier 17 of any conventional type.

Referring now additionally to FIG. 3, it will be seen that the received pulses A and B are in time coincidence at points $a$ and $b$ at the antenna ends respectively of the input circuits 11 and 12. These input signal pulses A and B are detected by the detectors 13 and 14 so that a detected pulse A appears at point $c$ of the input circuit 11, this detected pulse A still being in time coincidence with the received pulses A and B, i.e. undelayed. However, the detected pulse B has been delayed by time "$t$" by the delay circuit 15 so that it appears at point $d$ of the input circuit 12 delayed by time "$t$" with respect to the detected pulse A as shown in FIG. 3. The detected pulses A and B after passing through the adder circuit 16 occur in sequence separated by time "$t$" at point $e$, i.e., the output circuit of the adder circuit 16 and the input circuit of the logarithmic amplifier 17. The log of pulse A and the log of pulse B therefore appear, still separated by time "$t$" at point $f$ on FIG. 2, i.e., the output circuit of the logarithmic amplifier 17.

Two pulse separating circuits 18 and 19 are provided respectively connected to the output circuit of the logarithmic amplifier 17 by keying or switching circuits 20 and 21 respectively. Keying circuits 20 and 21 may be one tube amplifiers with the grids respectively driven to cut-off in order to prevent admission of a signal to the respective pulse separating circuits, and with the grids being driven positive, i.e., unblocked, in order to pass a signal pulse to the respective pulse separating circuits. In order to actuate the keying circuits 20 and 21, a keying pulse generator circuit 22 is provided connected to the output circuit of the logarithmic amplifier 17. Keying pulse generator 22, which may be of any conventional form, is triggered by the leading edge of the pulse A in the output circuit of logarithmic amplifier 17 to provide a keying pulse 23 having a width slightly wider than the width of the pulse A. The output circuit of the keying pulse generator 22 is directly connected to the actuating element of the keying circuit 20, i.e., for example the grid of the tube of the keying circuit 20 which is normally biased to cut-off, and is also connected to the actuating element of the keying circuit 21, likewise for example the grid of the tube which is also normally biased to cut-off, by a second delay circuit 24 having the same time delay "$t$" as the delay circuit 15. Reference to FIG. 3 will now indicate that the pulse 23 provided by the keying pulse generator 22 is directly applied to the keying circuit 20 and is delayed by time "$t$" to provide pulse 23' applied to the keying circuit 21.

A third time delay circuit 25 is connected in the signal separating circuit 18 and also has the same time delay "$t$" as the first delay circuit 15. Pulse separating circuits 18 and 19 are connected to the input circuits of a differential amplifier 26 which has its output circuit connected to the deflection means of cathode ray oscilloscope 27. Reference again additionally to FIG. 3 will indicate that the appearance of pulse log A in the output circuit of logarithmic amplifier 17 will trigger keying pulse generator 22 to provide pulse 23 which will actuate or unblock the keying circuit 20 so that the pulse log A is passed or admitted to the pulse separating circuit 18. The pulse 23' which actuates or unblocks the keying circuit 21 is however delayed by time "$t$" so that keying circuit 21 remains unactuated or blocked so that the pulse log A is not passed to the pulse separating circuit 19. It will be observed that the keying pulse 23 is slightly longer than the pulse log A thereby permitting the pulse log A completely to be admitted to the pulse separating circuit 18. However, pulse 23 is terminated before the application of pulse 23' to the keying circuit 21. Pulse 23' is applied to actuate or unblock the keying circuit 21 simultaneously with the occurrence of the pulse log B in the output circuit of the logarithmic amplifier 17 and thus, with the keying circuit 20 being now blocked, the pulse log B is passed or admitted to the pulse separating circuit 19. Thus, at points $i$ and $j$ in the pulse separating circuits 18 and 19, the pulses log A and log B respectively appear, still separated by the time "$t$" as shown in FIG. 3. Time delay circuit 25, however, delays the pulse log A in the pulse separating circuit 18 by time "$t$" so that at point $k$ in signal separating circuit 18, the pulse log A is now made coincident with the pulse log B appearing in the pulse separating circuit 19. Thus, the differential amplifier 26 provides in its output circuit a resulting pulse which is the difference of the pulses log A and log B in the pulse separating circuits 18 and 19, as shown at point $l$ in FIG. 3. Since the $$\log A - \log B = \log \frac{A}{B}$$

it will be seen that the output signal applied to the deflection means of the cathode ray oscilloscope 27 represents the ratio of the received signals A and B, the received signals having been sequentially passed through a single logarithmic amplifier 17 so that the tracking problems previously encountered in radio direction finding systems employing separate amplifiers for each channel are eliminated.

It may be found desirable to turn on the beam of the cathode ray oscilloscope 27 only when the signal $$\log \frac{A}{B}$$

is applied thereto from the differential amplifier 26, and for this purpose an intensity gate 28 suitably arranged to control the beam intensity of the cathode ray oscilloscope 27 is connected to the output of delay circuit 24, or alternatively to the output of the keying circuit 21, as shown in dashed lines in FIG. 2. Intensity gate 28 is arranged to control the beam intensity or brightness of the cathode ray oscilloscope 27 so that when the keying pulse 23' or the delay pulse log B is applied thereto, the beam of cathodle ray oscilloscope 27 is turned on thereby to display the directional information received from the differential amplifier 26. It will be understood that the directional information represented by the function $$\log \frac{A}{B}$$

will be displayed on the cathode ray oscilloscope 27 in terms of deflection of the beam from a given point and that the direction of the distant signal source from the installation is determined by rotating the antennas 1 and 2 until the deflection has been reduced to zero.

In FIG. 2 it can be seen that the signals emerging from the antenna are at once converted into rectified pulses, or into "video" as it is usually called. This scheme has the advantage that signals in a wide frequency range can be handled, for the antennas need not be narrowly tuned. The drawback is, however, that logarithmic video amplifiers are difficult to maintain and have long time constants. If it is only necessary to receive signals in a limited and predetermined frequency band, heterodyne technics and logarithmic IF amplifiers may be employed; the latter ones are simpler than logarithmic video amplifiers and have a faster response. This has been achieved in FIG. 4 by providing suitable mixers 29 and 30 respectively in the imput circuits 11 and 12, the mixers 29 and 30 being fed by a suitable local oscillator 31, with the output circuits of the mixers 29 and 30 being connected to the input circuits of the adding circuit 16; the output circuit of the adding circuit 16 is then connected to the input circuit of the logarithmic IF amplifier 32 which in turn has its output circuit connected to the same signal separating circuits comprising elements 22 through 26 of FIG. 2. It will be readily seen that the function of the system of FIG. 4 will be identical with that of FIG. 2, the only difference being the conversion of the frequency of the input pulses to a lower intermediate frequency.

Since the amplitude of the carrier signal provided by the local oscillator 31 may be relatively high and the amplitude of one or the other, or both of the received signals A and B may be relatively low, such a wide ratio of carrier to modulating signal may result in the IF amplifier 32 responding to the carrier, thus resulting in the necessity for providing a wider dynamic range in the amplifier 32 corresponding to the ratio between the carrier and modulation signals. It may therefore be desirable to suppress the carrier of the local oscillator 31 in the output of the mixers 29 and 30, and this may be conveniently accomplished, as shown in FIG. 5, by employing two similar balanced modulators 59 and 60 which, as is well known in the art, suppress the carrier in their outputs, providing only the sum and difference side bands; detectors are not shown in FIG. 5 since they are conventionally contained in balanced modulators. Since in this case both side bands contain the desired information, either or both of the side bands provided by the balanced modulators may be passed through the adding circuit 16 and employed in the logarithmic amplifier 32.

Referring now to FIG. 6 in which like elements are again indicated by like reference numerals, here, the output circuit of the adding circuit 16 is connected to the imput circuit of an automatic gain control-type amplifier 33 which in turn is connected to the input circuit of a non-linear or compression amplifier 34 with its output circuit being connected to the pulse separating circuits 22 through 26. The AGC amplifier 33 replaces the logarithmic amplifier 32 of FIG. 4. Such an AGC amplifier can be made to set the gain almost instantaneously on receipt of a signal; this gain is set so as to keep the amplifier output nearly constant. The time constant of the AGC amplifier is much larger than the time between A and B pulses (which is determined by delay circuit 15). Hence, if A is stronger than B, the gain is automatically adjusted so as to keep the output of amplifier 33 constant, and B is received with the same gain, so that the difference between the outputs for A and B is a measure of their relative strength, independently of their absolute strength. If, however, B exceeds A, the amplifier gain will be reset when B arrives. In this case, the next arriving pulse will be split into two pulses A, B received with a constant amplifier gain, provided the time constant is larger than the time between subsequent incoming pulses.

It is seen that this device eliminates the variable quantity of the pulses A and B and in some instances, the automatic gain control amplifier 33 may be directly connected to the pulse separating circuits 22 through 26. If, however, a closer approximation of logarithmic compression is desired, non-linear or compression amplifier 34 may be inserted between the output circuit of automatic gain control amplifier 33 and the pulse separating circuit 22 through 26 which will provide compression of the pulses over a limited dynamic range, for example, 30 db. The system of FIG. 6 will reduce the effect of extraneous and other weak signals, only the strongest signals generally being of interest. The non-linear amplifier 34 may be a single remote cut-off tube, as is well known in the art.

Referring now to FIG. 7, there is shown an alternative form of pulse separating circuit which may be substituted for the pulse separating arrangement 22 through 26 of the previous embodiment. Here, the amplifier which may be amplifier 17 of FIG. 2, 32 of FIGS. 4 and 5 or 34 of FIG. 6, has its output circuit connected to a time delay circuit 35 again having the same time delay "$t$" as the time delay circuit 15 in the imput circuit 12, which in turn is connected to one of the imput circuits of differential amplifier 26. The output circuit of the amplifier 17, 32 or 34 is also directly connected to the other input circuit of differential amplifier 26, as by a connection 36. Thus, the delay circuit 35 and the connection 36 constitute two pulses separating circuits and reference to FIG. 8 will indicate that at points $m$, the signals log A and log B have their original relationship as they appeared in the output of amplifier 17, 32 or 34, whereas the pulses log A and log B at point $n$ are delayed by the time "$t$" with respect to the pulses in the connection 36. It will therefore be seen that the pulses log B and log A are brought into coincidence in the input circuits of the differential amplifier 26. In order that only the difference of the pulses log B and log A may appear on the display of the cathode ray oscilloscope 27, an "AND" circuit 37 is provided connected respectively to the connection 36 and the output of the delay circuit 35. Such circuits are well known in the art and provide an output signal only responsive to the simultaneous occurrence of signals in both input circuits. Thus, at point $o$ in FIG. 7, the AND circuit 37 provides a signal as shown in FIG. 8 which is the sum of the signals log A and log B. This signal is applied to intensity gate 38 which is connected to control the beam intensity of the cathode ray oscilloscope 37 so that the beam is turned on only when the signals log B and log A coincide in the differential amplifier 26 and in the AND circuit 37. Thus, while the signals log A' and log B', as shown in FIG. 8, pass through the differential amplifier 26 and are impressed on the deflecting means of the cathode ray oscilloscope 27, the beam of the tube 27 is not turned on at these points and is only turned on at that time when signals log B and log A are in coincidence, that is when the delayed signal is in coincidence with the undelayed signal.

Referring now to FIG. 9, there is shown a radio direction finding system of the type shown in FIG. 2 arranged to receive four input signals identified as A, B, C and D. Here, with like elements again being indicated by like reference numerals, antennas 1 and 2 may be arranged in one plane with the antennas 39 and 40 being arranged in a plane at right angles to the plane of antennas 1 and 2. Antennas 1 and 2 are again connected to input circuits 11 and 12 with detectors 13 and 14 connected therein and with delay circuit 15 having a delay time "$t$" connected in input circuit 12. Antennas 39 and 40 are respectively connected to input circuits 41 and 42 having detectors 43 and 44 respectively connected therein and with delay circuits 45 and 46 also respectively connected in input circuits 41 and 42 and respectively having the delay times twice and three times that of the delay circuit 15. Input circuits 11, 12, 41 and 42 are respectively connected to the input circuits of adder circuit 47 so that the detected signals A, B, C and D occur in sequence in the output circuit of the adder circuit 47, as at 48. The output circuit of the adder circuit 47 is again connected to the input circuit of the logarithmic amplifier 17, as in the case of the circuit of FIG. 2 and the output circuit of the logarithmic amplifier 17 is then connected to four pulse separating circuits 18, 19, 49 and 50 respectively by keying circuits 20, 21, 51 and 52. The output circuit of the logarithmic amplifier 17 is also again connected to keying pulse generator 22 which has its output circuit again directly connected to the keying circuit 20 and respectively connected to the keying circuits 21, 51 and 52 by delay circuits 53, 54 and 55; delay circuit 53 has the same time delay as delay circuit 15 while delay circuits 54 and 55 respectively have twice and three times the delay of delay circuit 15, i.e., respectively the same as delay circuits 45 and 46. Pulse separating circuits 18 and 19 respectively have delay circuits 25 and 56 connected therein and pulse separating circuit 49 has delay circuit 57 connected therein, delay circuits 25, 56 and 57 respectively having three times, two times and the same delay as the delay circuit 15. Pulse separating circuits 18 and 19 are connected to the input circuits of differential amplifier 26 while pulse separating circuits 49 and 50 are connected to the input circuits of differential amplifier 58; the output circuit of differential amplifier 26 is connected to one of the deflection means of the cathode ray oscilloscope 27 while the output circuit of differential amplifier 28 is connected to the other deflection means of cathode ray oscilloscope 27. It is now seen that with this arrangement, the pulses A and B are brought into coincidence in the input circuits of differential amplifier 26 thereby providing a resulting output signal which is $$\log \frac{A}{B}$$

while the pulses C and D are likewise brought into coincidence in the input circuits of differential amplifier 58, thereby providing a resulting output signal $$\log \frac{C}{D}$$

These two resulting signals, therefore, when applied to the vertical and horizontal deflecting means of the cathode ray oscilloscope 27 will provide two-dimensional information concerning the distant source of signal pulses. Here again, an intensity gate 28 may be connected to the output of the delay circuit 25 (or alternatively the output of the keying circuit 52) and in turn connected to control the beam intensity of the cathode ray oscilloscope 27 thereby to turn on the beam only when the differential amplifiers 26 and 58 are providing the output pulses $$\log \frac{A}{B} \text{ and } \log \frac{C}{D}$$

It will now be seen that I have provided an improved radio direction finding system of the type providing an output signal representing the ratio of the input signals thereby providing directional information independent of the power input, in which the input signals are sequentially passed through the same amplifier, i.e., share time in the same amplifier circuit, so that the problems encountered in previous systems of this type with regard to non-uniform tracking of amplifiers in two or more channels is eliminated.

While I have described above the principles of my invention in connection with specific apparatus, it is to be clearly understood that this description is made only by way of example and not as a limitation to the scope of my invention.

What is claimed is:

1. A radio direction finding system comprising: two input circuits for respectively receiving a radio signal from a distant source and for respectively providing two input signals; first time delay means connected in one of said input circuits for delaying one of said input signals with respect to the other; means coupled to said input circuits for adding the undelayed and delayed signals respectively therein whereby said undelayed and delayed signals occur in sequence; amplifying means coupled to said adding means; two signal separating circuits respectively coupled to said amplifying means by switching means; means coupled to said amplifying means and to the switching means of one of said signal separating circuits for actuating the same to pass only the said undelayed signal; second time delay means having the same time delay as said first time delay means coupled to said actuating means and to the switching means of the other of said signal separating circuits for actuating the same to pass only said delayed signal; third time delay means connected in said one signal separating circuit and having the same time delay as said first time delay means whereby the undelayed signal in said one signal separating circuit is made coincident with the delayed signal in said other signal separating circuit; and means coupled to said signal separating circuits for differentially combining the signals therein thereby providing an output signal representing the difference of said coincident signals in said signal separating circuits.

2. A radio direction finding system comprising: two input circuits for respectively receiving a radio signal comprising spaced pulses from a distant source and for respectively providing two input pulses; a first time delay circuit connected in one of said input circuits whereby the input pulses therein are delayed with respect to the input pulses in the other input circuit; an adding circuit connected to said input circuits and having an output circuit whereby said undelayed and delayed pulses occur in sequence in said output circuit; an amplifier having its input circuit connected to said output circuit of said adder circuit and having an output circuit; two pulse separating circuits respectively connected to said amplifier output circuit by first and second keying circuits; a keying pulse generator having an input circuit connected to said amplifier output circuit and having an output circuit, said keying pulse generator being adapted to provide keying pulses longer than said input pulses responsive respectively to the occurrence of said undelayed pulses in said amplifier output circuit, said keying pulse generator output circuit being connected to said keying circuit of one of said pulse separating circuits and actuating the same responsive to said keying pulse to pass only said undelayed pulses to said one pulse separating circuit; a second time delay circuit having the same time delay as said first time delay circuit connecting said keying pulse generator output circuit and the other of said keying circuits whereby said other keying circuit is actuated responsive to the delayed keying pulse to pass only said delayed pulses to the other pulse separating circuit; a third time delay circuit having the same time delay as said first time delay circuit connected in said one pulse separating circuit whereby the undelayed pulses in said one pulse separating circuit are made coincident with the delayed pulses in said other pulse separating circuit; and a differential amplifier having two input circuits connected respectively to said pulse separating circuits and having an output circuit for providing an output pulse representing the difference in said input pulses.

3. A radio direction finding system comprising: two input circuits for respectively receiving a radio signal comprising spaced pulses from a distant source and for respectively providing two input pulses; a first time delay circuit connected in one of said input circuits whereby the input pulses therein are delayed with respect to the input pulses in the other input circuit; an adding circuit connected to said input circuits and having an output circuit whereby said undelayed and delayed pulses occur in sequence in said output circuit; an amplifier having its input circuit connected to said output circuit of said adder circuit and having an output circuit; two pulse separating circuits respectively connected to said amplifier output circuit by first and second keying circuits; a keying pulse generator having an input circuit connected to said amplifier output circuit and having an output circuit, said keying pulse generator being adapted to provide keying pulses longer than said input pulses responsive respectively to the occurrence of said undelayed pulses in said amplifier output circuit, said keying pulse generator output circuit being connected to said keying circuit of one of said pulse separating circuits and actuating the same responsive to said keying pulse to pass only said undelayed pulses to said one pulse separating circuit; a second time delay circuit having the same time delay as said first time delay circuit connecting said keying pulse generator output circuit and the other of said keying circuits whereby said other keying circuit is actuated responsive to the delayed keying pulses to pass only said delayed pulses to the other pulse separating circuit; a third time delay circuit having the same time delay as said first time delay circuit connected in said one pulse separating circuit whereby the undelayed pulses in said one pulse separating circuit are made coincident with the delayed pulses in said other pulse separating circuit; a differential amplifier having two input circuits connected respectively to said pulse separating circuits and having an output circuit adapted to be connected to deflection means of cathode ray oscilloscope means for providing an output pulse representing the difference in said input pulses; and means coupled to said other pulse separating means and adapted to be connected to control the beam intensity of said oscilloscope only when said coincident pulses occur in said input circuits of said differential amplifier.

References Cited in the file of this patent

UNITED STATES PATENTS

| | | |
|---|---|---|
| 2,422,073 | Bond | June 10, 1947 |
| 2,458,280 | Lindenblad | Jan. 4, 1949 |
| 2,489,304 | Marchand et al. | Nov. 29, 1949 |
| 2,931,032 | Newhouse | Mar. 29, 1960 |